(12) United States Patent
Falkner et al.

(10) Patent No.: US 6,907,685 B1
(45) Date of Patent: Jun. 21, 2005

(54) PORTABLE LIGHTED DISPLAY

(75) Inventors: Jason R. Falkner, Tampa, FL (US); Paul Lankford, Tampa, FL (US); Scott L. Biron, New Port Richey, FL (US)

(73) Assignee: Lighted Logos, L.C., Tampa, FL (US)

( * ) Notice: Subject to any disclaimer, the term of this patent is extended or adjusted under 35 U.S.C. 154(b) by 269 days.

(21) Appl. No.: 10/217,567

(22) Filed: Aug. 14, 2002

Related U.S. Application Data (63) Continuation-in-part of application No. 10/151,243, filed on May 21, 2002, now Pat. No. 6,708,433.

(51) Int. Cl.$^7$ ................................................ G09F 7/00
(52) U.S. Cl. ............................ 40/597; 40/552; 40/593
(58) Field of Search ......................... 40/545, 546, 550, 40/551, 552, 564, 584, 591, 593, 597; 362/249, 503, 223; 248/205.5, 205.9

(56) References Cited

U.S. PATENT DOCUMENTS

| | | | |
|---|---|---|---|
| 2,277,981 A | | 3/1942 | Horton |
| 2,895,245 A | | 7/1959 | Spangler |
| 3,145,493 A | * | 8/1964 | Escalante ..................... 40/551 |
| 3,242,329 A | | 3/1966 | Abrams |
| 3,755,943 A | | 9/1973 | Cesarotti |
| 3,879,005 A | * | 4/1975 | Flick ....................... 248/205.5 |
| 3,894,225 A | | 7/1975 | Chao |
| 3,905,017 A | | 9/1975 | Samra |
| 3,995,152 A | | 11/1976 | Chao et al. |
| 4,173,035 A | | 10/1979 | Hoyt |
| 4,196,882 A | * | 4/1980 | Rognon .................... 248/205.9 |
| 4,263,640 A | | 4/1981 | Altman |
| 4,597,033 A | | 6/1986 | Meggs et al. |
| 4,607,317 A | | 8/1986 | Lin |
| 4,607,444 A | | 8/1986 | Foster |
| 4,667,428 A | | 5/1987 | Elmer |
| 4,970,812 A | | 11/1990 | Tanaka et al. |

(Continued)

FOREIGN PATENT DOCUMENTS

DE       201 17 762       4/2002

OTHER PUBLICATIONS

Neo–Neon™, "The World of Brightness", Lighting System Catalog 2001–2002, Duralight Series, 2 Wire Mini Fixing Duralight™, p. 33.

(Continued)

Primary Examiner—Lars A. Olson
(74) Attorney, Agent, or Firm—Banner & Witcoff, Ltd.

(57) ABSTRACT

A portable display unit is provided that illuminates a symbol formed by the unit. The display unit has a body substantially forming the symbol, which has an outline surface for receiving a rope light. The outline surface defines an inner region of the symbol and at least a section of the body substantially fills the inner region. The display unit further includes a rope light attached to the outline surface and connected to a power cord, as well as a hanging element attached to the body for removably attaching the unit to a support surface. The body and rope light may have various colors to enhance the symbol or represent colors for the logo formed by the symbol. In one embodiment, the body defines a channel and the outline surface forms a surface of the channel.

28 Claims, 11 Drawing Sheets

U.S. PATENT DOCUMENTS

| | | | |
|---|---|---|---|
| 4,976,057 A | | 12/1990 | Bianchi |
| 5,016,145 A | | 5/1991 | Singleton |
| 5,084,994 A | | 2/1992 | Elmer |
| 5,339,551 A | | 8/1994 | Elmer |
| 5,396,408 A | * | 3/1995 | Szczech, III ................ 362/397 |
| 5,400,225 A | * | 3/1995 | Currie ........................ 362/554 |
| 5,534,315 A | | 7/1996 | Witte |
| 5,555,163 A | | 9/1996 | Pisani |
| 5,934,792 A | | 8/1999 | Camarota |
| 6,042,248 A | | 3/2000 | Hannah et al. |
| 6,179,440 B1 | | 1/2001 | Palmer |
| 6,302,560 B1 | * | 10/2001 | Lai ............................ 362/249 |
| 6,347,471 B1 | | 2/2002 | Mirza |
| 6,394,623 B1 | | 5/2002 | Tsui |
| 6,394,626 B1 | | 5/2002 | McColloch |
| 6,478,450 B1 | | 11/2002 | Grajcar |
| 6,557,283 B1 | * | 5/2003 | Canfield ...................... 40/564 |
| 2002/0063686 A1 | | 5/2002 | Schaum |
| 2003/0072158 A1 | | 4/2003 | Huang |
| 2003/0204975 A1 | | 11/2003 | Holder et al. |

OTHER PUBLICATIONS

Neo–Neon™, "The World of Brightness", Lighting System Catalog 2001–2002, Duralight Series, 2 Wires Ultra–Brite Fixing Duralight™ 13mm, p. 53.

Neo–Neon™, "The World of Brightness", Lighting System Catalog 2001–2002, Duralight Series, 2 Wires Ultra–Brite Fixing Duralight™ 16mm, p. 54.

Neo–Neon™, "The World of Brightness", Lighting System Catalog 2001–2002, Duralight Series, Connecting System, pp. 55–56.

Neo–Neon™, "The World of Brightness", Lighting System Catalog 2001–2002, 2 Wires Ultra–Brite Flat Fixing Duralight™, p. 57.

Neo–Neon™, "The World of Brightness", Lighting System Catalog 2001–2002, Duralight Series, 3 Wire Bi–Color Duralight™ Series, p. 58.

Neo–Neon™, "The World of Brightness", Lighting System Catalog 2001–2002, Duralight Series, 3 Wires Bi–Color Flat Duralight Series, p. 59.

Neo–Neon™, "The World of Brightness", Lighting System Catalog 2001–2002, Duralight Series, LED Everlight Series, pp. 60–61.

Neo–Neon™, "The World of Brightness", Lighting System Catalog 2001–2002, Motif Series, Duralight™ Motif, p. 133.

Neo–Neon™, "The World of Brightness", Lighting System Catalog 2001–2002, Motif Series, Valentine's Motif, p. 134.

Neo–Neon™, "The World of Brightness", Lighting System Catalog 2001–2002, Motif Series, Halloween Motif, p. 135.

Neo–Neon™, "The World of Brightness", Lighting System Catalog 2001–2002, Motif Series 2001 Millenium Motif, pp. 136, 139–140.

Neo–Neon™, "The World of Brightness", Lighting System Catalog 2001–2002, Motif Series, Gift Motif, p. 143.

Neo–Neon™, "The World of Brightness", Lighting System Catalog 2001–2002, Motif Series, Fancy Motif (GS) Dia. 13mm, p. 144–145.

Neo–Neon™, "The World of Brightness", Lighting System Catalog 2001–2002, Motif Series 3–D Motif, p. 146.

Neo–Neon™, "The World of Brightness", Lighting System Catalog 2001–2002, Motif Series, Animated Motif, p. 147.

Neo–Neon™, "The World of Brightness", Lighting System Catalog 2001–2002, Motif Series, Portable Duralight™ Sign, p. 148.

Neo–Neon™, "The World of Brightness", Lighting System Catalog 2001–2002, Motif Series, Belt Light Motif, p. 149.

Neo–Neon™, "The World of Brightness", Lighting System Catalog 2001–2002, Motif Series, Play Light Moti Series, p. 150.

* cited by examiner

PORTABLE LIGHTED DISPLAY

This application is a continuation-in-part of U.S. patent application Ser. No. 10/151,243 filed on May 21, 2002, now U.S. Pat. No. 6,708,433, which is expressly incorporated herein by reference.

FIELD OF THE INVENTION

This invention relates generally to lighted display units. More particularly, the present invention relates to a portable lighted display unit that is easily attachable and removable from a support surface.

BACKGROUND OF THE INVENTION

Display units that illuminate logos and other symbols are well known and come in a variety of shapes and sizes. For example, commercial signs have long used lights in various configurations to form symbols and to illuminate signs. Neon lights are a particular example of such commercial signs. Although neon lights prominently form symbols, they are expensive and are not well suited to portable displays because of their inability to absorb forces without breaking and their power requirements. As such, neon lights and similar lighted signs are typically permanently fixed to a support body, such as a building. Less permanent signs are also known that illuminate symbols. These versions typically use strings of lights, such as those used for holiday lighting, in an arrangement to form symbols, logos, or decorative patterns. The strings of lights are commonly attached to support surfaces using semi-permanent attachment devices such as clips or hooks.

Portable lighted signs and symbols are also known. An example of a conventional portable illuminated symbol is a detachable vehicle sign, such as used by many pizza delivery drivers. These portable displays tend to use strings of lights or small light bulbs organized in a particular pattern. Strings of lights, however, tend to become tangled and are time consuming to hang and remove. Further, both strings of lights and light bulbs tend to burn out and require replacement of individual bulbs. In addition, the structures and attachment mechanisms for such systems are often bulky and heavy.

Improvements over neon lights, strings of lights, and other light bulb arrangements have been proposed for creating substantially permanent symbols and designs. These include rope lights hung in a manner similar to holiday lights, such as from a building. A rope light is a generally linear, flexible light unit that is particularly durable and that includes an elongated cylinder resembling a rope having lights embedded therein. The elongated cylinder is typically made of a flexible plastic material that is translucent or transparent. Conventional light units that use rope lights to form designs include rope lights attached to wire or another formative body that retains the rope light in a particular shape. However, previous units have not provided mobile displays for taking advantage of the benefits of rope lights. Further, previous designs have used rope lights alone to form a particular linear symbol or design, rather than in conjunction with other display materials.

SUMMARY OF THE INVENTION

The present invention provides a portable display unit that forms a symbol having an inner region and a rope light outlining the inner region. The display unit includes a symbol body that substantially fills the inner region and may have an outline surface defining the inner region. The rope light is preferably attached to the outline surface and serves to accentuate the symbol—particularly when illuminated. With a filled inner region, symbols can be formed that have more depth than rope lighting alone. The rope light enhances the symbol by illuminating the filled inner region and by emphasizing the outline of the symbol. Further, the rope light may display one color and the body, particularly in the inner region, may display another color. Thus, for a symbol such as a university logo, the university colors may be represented between the rope light and the inner region.

According to one embodiment of the display unit, the body defines a channel for receiving the rope light and the outline surface forms a surface of the channel. In one embodiment, the body defines pinch points within the channel for frictionally retaining the rope light. The pinch points may be formed from an opposing pair of projections within the channel. The body is preferably formed from injection molded plastic, which permits the projections and channel to be integrally formed with the body.

According to one embodiment of the invention, at least a portion of the symbol body located rearward of the rope light is opaque and shades a rearward portion of the light emitted from the illuminated rope light. As such, the symbol is clearly seen from a forward direction, yet illumination is reduced in a rearward direction. The entire body may be opaque according to one embodiment, which serves to further reduce rearward illumination.

The hanging elements may include suction cups for attaching the display unit to a window of a vehicle. In one embodiment, the suction cups may include double suction cups that have a pair of opposing suction cup surfaces. One suction cup surface may be attached to the symbol body and the opposing suction cup surface may be attached to a support surface, such as a wall or vehicle window. Thus, the display unit may be quickly and easily installed without complicated attachment mechanisms or without stringing lights. It may also be easily removed and placed out of view.

BRIEF DESCRIPTION OF THE DRAWINGS

The invention will be described in detail in the following description of preferred embodiments with reference to the following figures wherein.

DETAILED DESCRIPTION OF THE INVENTION

The invention may be embodied in various forms. As shown in FIGS. 1–6, one embodiment according to the present invention includes a display unit 10 that generally includes a symbol body 12, an outline surface 13, an inner region 14, an elongated flexible lighting strip (rope light) 16, a power cord 18, and a number of attachment devices in the form of suction cups 20. The outline surface 13 may be formed as part of the body 12. The outline surface 13 forms the shape of at least a portion of the symbol and defines inner region 14 of the symbol. Rope light 16 is preferably attached to the outline surface 13 of body 12 and also outlines inner region 14; however, rope light 16 may be attached to other surfaces or structures provided it outlines inner region 14. Symbol 11 in this example is the letter "X", which is the logo for hypothetical University X. Suppose that the colors for University X are blue and white. Accordingly, inner region 14 may be colored white and rope light 16 may have a blue tint. As such, when viewed from the front, the colors and logo of University X are represented by display unit 10.

In addition to showing the logo for University X, display unit 10 further emphasizes the logo. To do so, rope light 16, which outlines the logo, may illuminate to emphasize the logo. Rope light 16 may be illuminated by connecting power cord 18 to a power supply, such as a DC power supply for the automobile 22 shown in FIG. 1. As shown, display unit 10 is adapted to connect to a window 24 of automobile 22 via attachment devices such as suction cups 20. The suction cups 20 are attached to body 12 and permit display unit 10 to be easily attached to and removed from window 24.

Figure 5:
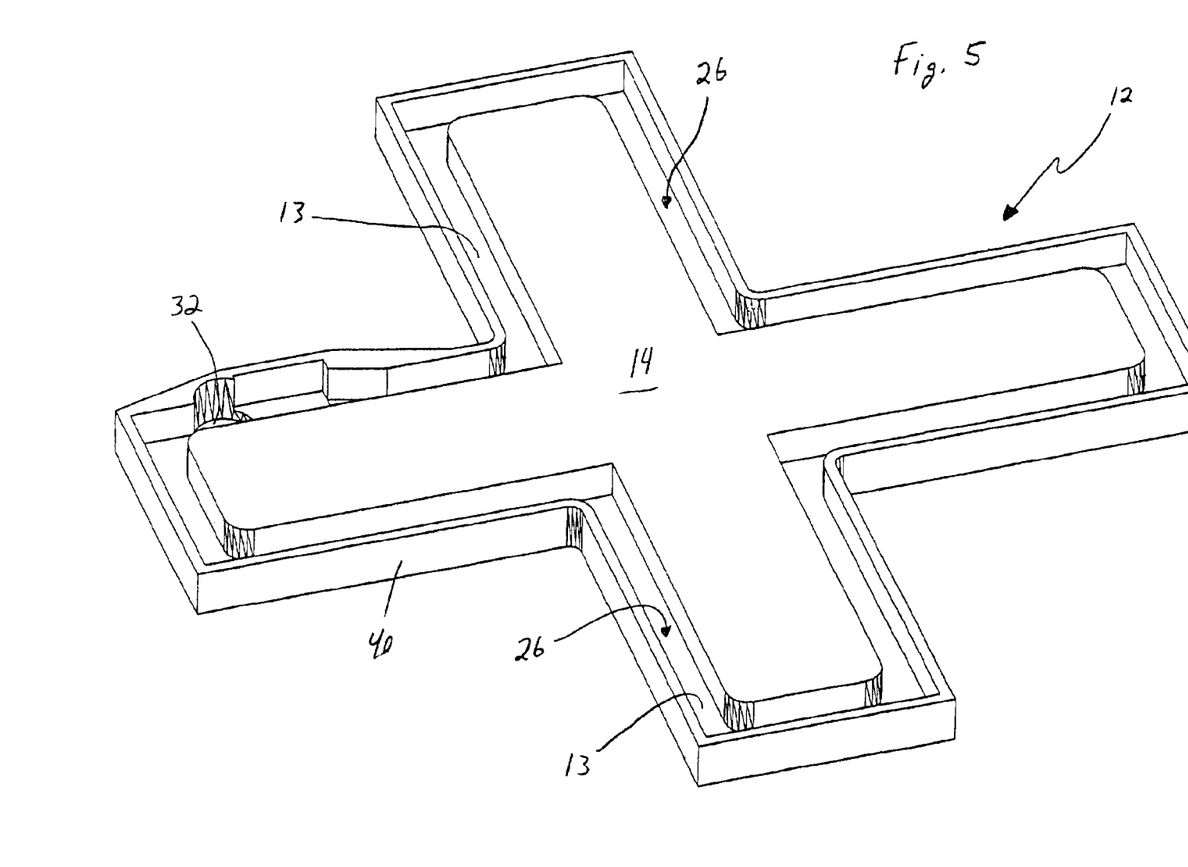
FIG. 5 is a front perspective view of the body of the display unit of FIG. 2 shown with the rope light removed.
Figure 6:
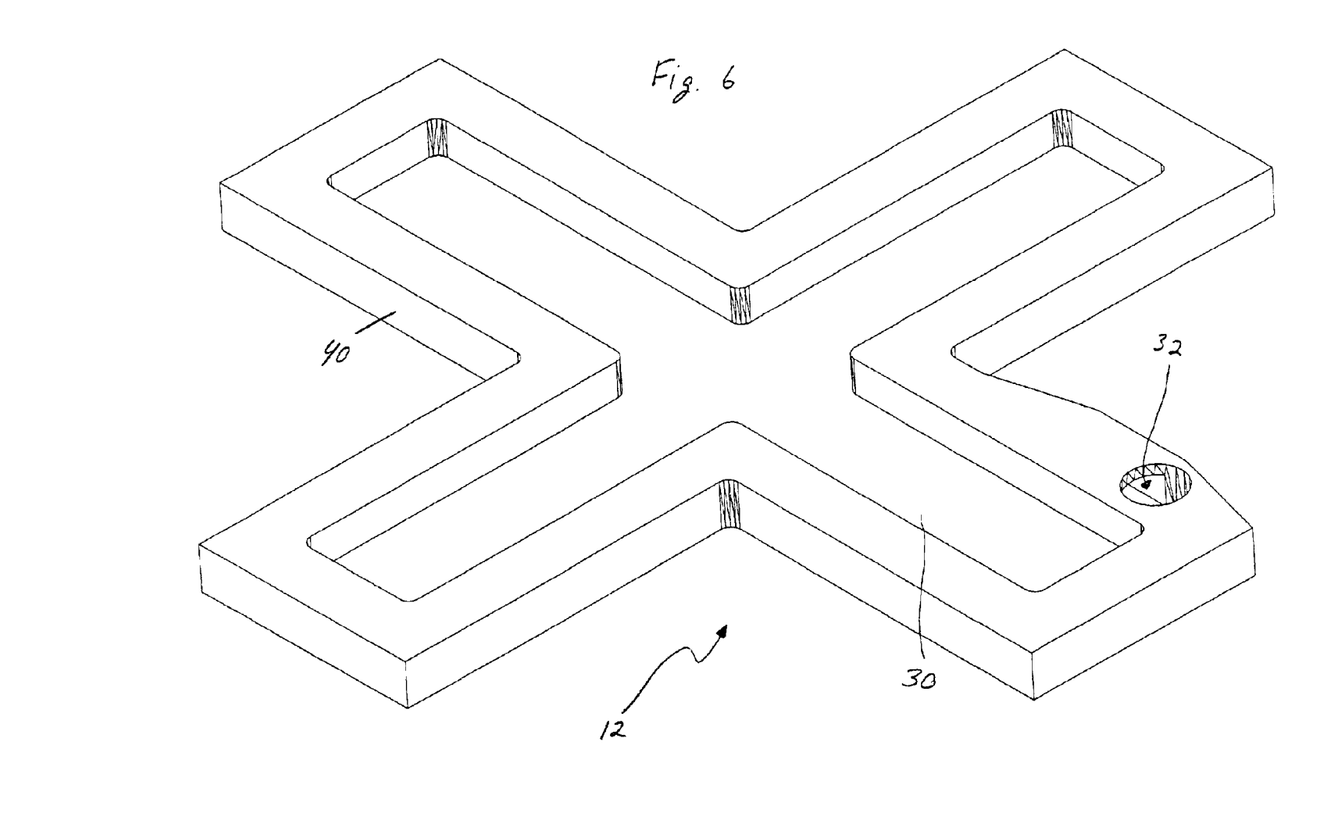
FIG. 6 is a rear perspective view of the body of the display unit of FIG. 2 shown with the rope light removed.

Referring now to FIGS. 5 and 6, body 12 according to an embodiment is shown. As shown in FIG. 5, which is a front perspective view, body 12 defines a channel 26 that is shaped to receive and retain rope light 16. Outline surface 13 in this embodiment forms a rearward surface of channel 26 and defines an inner region 14 of the logo symbol 11. Outline surface 13 could be any surface within channel 26 or in the proximity of channel 26 that defines at least a portion of the inner region of the logo. Body 12 at least partially fills inner region 14. According to one embodiment, adhesive 15 may be used to fasten rope light 16 to outline surface 13. In other embodiments, other fasteners such as frictional retainers, ties, and hook and loop fasteners may be used. FIG. 6 is a rear perspective view of body 12 showing a back surface 30.

Body 12 may be made from a variety of materials, such as metal and plastic. According to one embodiment, body 12 is formed from an injection molded plastic, such as polypropylene. Forming the body as an injection-molded object provides many advantages, such as permitting the integral formation of channel 26 and reducing manufacturing costs. As discussed below in other embodiments, pinch points, projections for forming pinch points, and other features may be easily integrally formed with an injection-molded body. The plastic material is preferably a colored, opaque plastic material having a color in accordance with the represented symbol; however, it could be translucent or transparent as desired.

When made from an opaque material, body 12 can act as a shade to block rearward illumination from rope light 16, which may be undesirable in certain instances. For example, when display unit 10 is attached to rear window 24 of vehicle 22, it blocks light from the device that would be visible to the vehicle driver. This may be easier on the eyes for the driver. If body 12 is generally translucent or transparent, outline surface 13 may be coated or otherwise formed as an opaque surface that shades rearward illumination from rope light 16.

In another embodiment, back side 30 shown in FIG. 6 could be coated or otherwise formed as an opaque surface to block rearward illumination. Coating back side 30 provides the advantage of allowing body 12 to be made from a translucent plastic having a tint of a desired color. As such, illumination from rope light 16 may infuse translucent inner region 14 and cause it to glow. Thus, the symbol may be more easily seen in a direction forward from the display unit 10, yet the shading by back side 30 can reduce rearward illumination. To further aid such illumination, the coating (not shown) on back side 30 may be reflective in a forward direction. In order to permit access to power cord 18 with limited rearward illumination, body 12 may have an access hole 32 formed there through. This arrangement blocks substantially all rearward light both within the symbol body 12 and on any portions extending from the symbol body.

Figure 2:
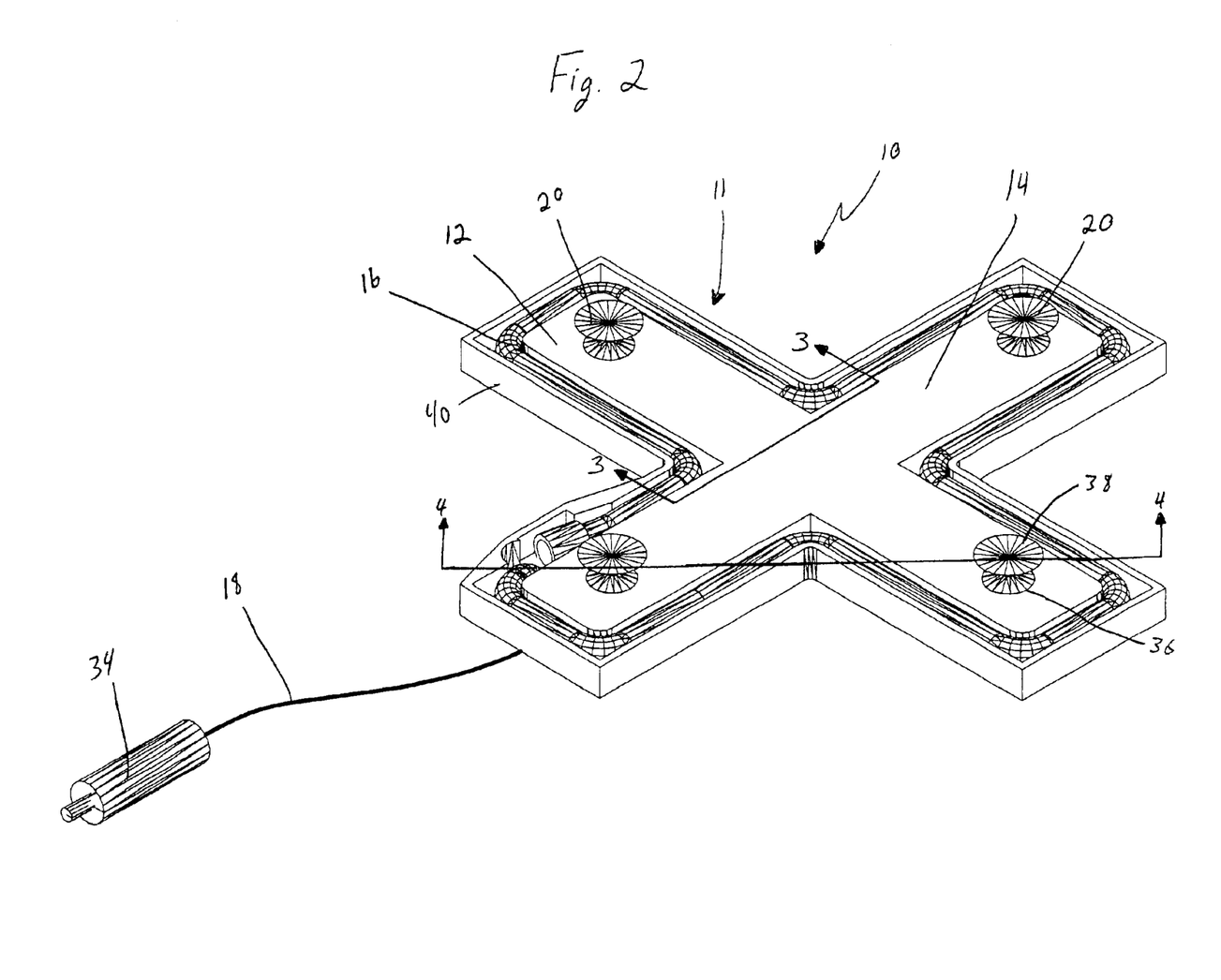
FIG. 2 is a front perspective view of the display unit of FIG. 1 shown detached from the vehicle.
Figure 3:
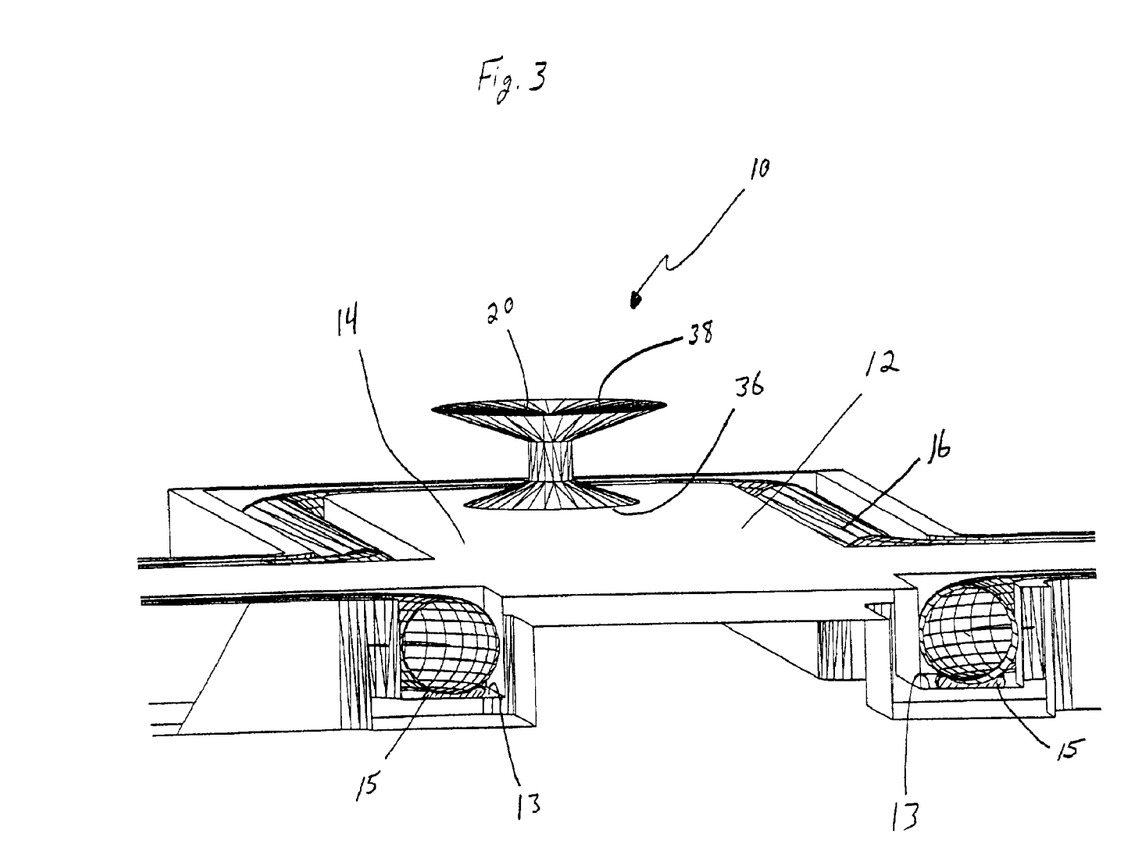
FIG. 3 is a cross-sectional perspective view taken along line 3—3 of the display unit of FIG. 2.
Figure 4:
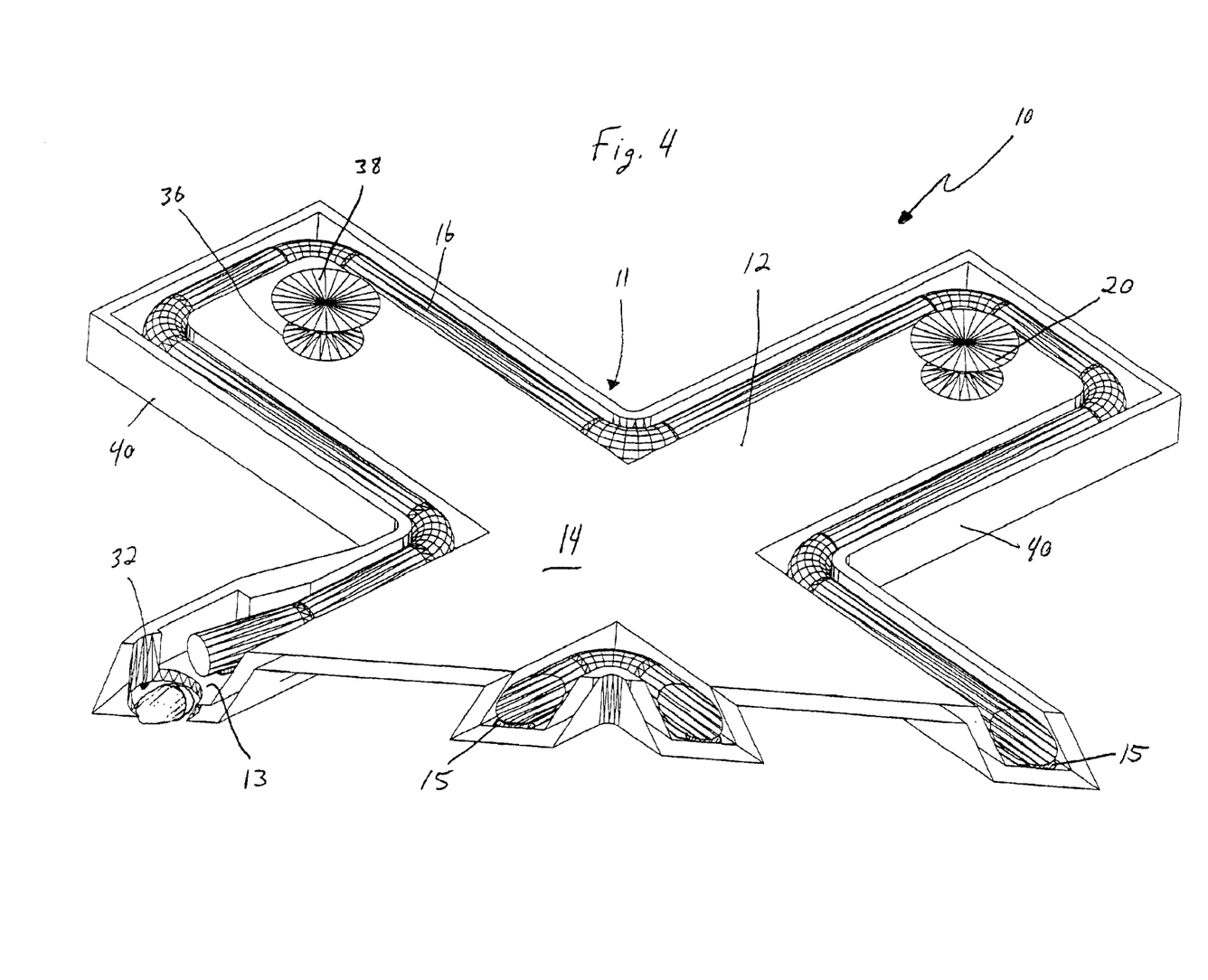
FIG. 4 is an angled cross-sectional perspective view taken along line 4—4 of the display unit of FIG. 2.

As shown in FIGS. 2–4, rope light 16 is received in channel 26 and fastened to outline surface 13 of body 12. As attached, rope light 16 outlines inner region 14 and the logo 11. One end of rope light 16 is attached to power cord 18, which can include a DC power connector 34. In other embodiments, power connector 54 may be adapted to connect to an AC power supply. In this embodiment, DC power connector 54 is adapted to be received by a vehicle DC power outlet (not shown), such as cigarette lighter outlet. Accordingly, display unit 10 may easily be connected and disconnected from such a power outlet.

To facilitate easy removal and installation, suction cups 20 may be used to attach display unit 10 to a surface, such as vehicle window 24. In one embodiment, each suction cup 20 is a double suction cup that has a first suction surface 36 and an opposing second suction surface 38. First suction surface 36 connects to a portion of body 12, such as inner region 14, and second suction surface 38 connects to an outline surface, such as rear vehicle window 24. Double suction cups 20 provide attachment flexibility in that they may attach to a variety of support surfaces and they may connect to various portions of display unit 10. For example, suction cups 20 may be connected to back side 30 for attaching display unit 10 to an outer surface of vehicle 22, or they may even be connected to sides 40 of body 12.

In operation, display unit 10 provides a logo or symbol 11 that is highly visible in either daylight or at night. The inner region 14 forms the shape of the logo or symbol 11 and is particularly prominent in daylight. Rope light 16 outlines inner region 14 to reinforce the shape formed by inner region 14. At times of reduced light, such as at night, rope light 16 makes the display unit 10 highly visible. The light from rope light 16 forms a clear outline of the desired logo or symbol 11 and also serves to illuminate inner region 14. Inner region 14 and rope light 16 thereby enhance one another to create a highly visible display of symbol 11 in reduced light or darkness.

Figure 1:
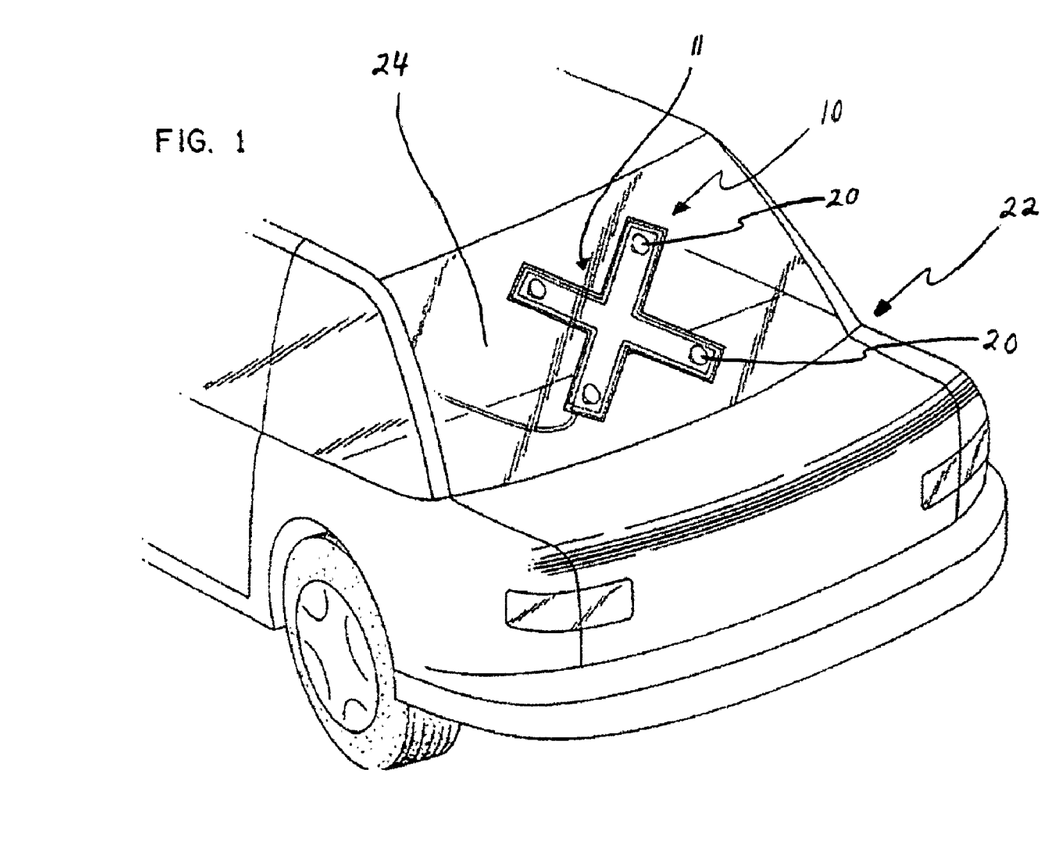
FIG. 1 is a perspective view of a display unit according to the present invention installed on a rear window of a vehicle.

Display unit 10 is easy to install and remove from a display location. As shown in FIG. 1, display unit 10 may be easily attached to a window 24 of a vehicle by simply pushing the outer surface 38 of suction cups 20 against window 24. As desired, display unit 10 may be illuminated by connecting DC power connector 54 to a DC outlet (not shown). Power cord 18 or power connector 54 may include a switch (not shown) for selectively turning rope light 16 on and off. Display unit 10 may be removed by unplugging power connector 54 from the outlet and removing it from window 24. It may be removed by squeezing suction cups 20 to break the vacuum formed between each suction cup 20 and window 24. In other embodiments, power connector 54 may be an AC power connector for receiving an AC power supply.

Display unit 10 is easy to manufacture as well as to use. Display unit 10 may be made by forming body 12 and fastening rope light 16 to outline surface 13. In one embodiment, rope light 16 may be placed into channel 26 and fastened via an adhesive 15. Further, power cord 18 may be threaded through access hole 32. Because of the ease of assembly, display unit 10 may be sold as a kit and a consumer may simply assemble the unit as described above. Alternatively, it may be sold partially or wholly assembled. In a partially assembled state, the user may simply complete assembly by attaching suction cups 20 to body 12 and then connecting display unit 10 as desired to a support surface via suction cups 20.

Figure 7:
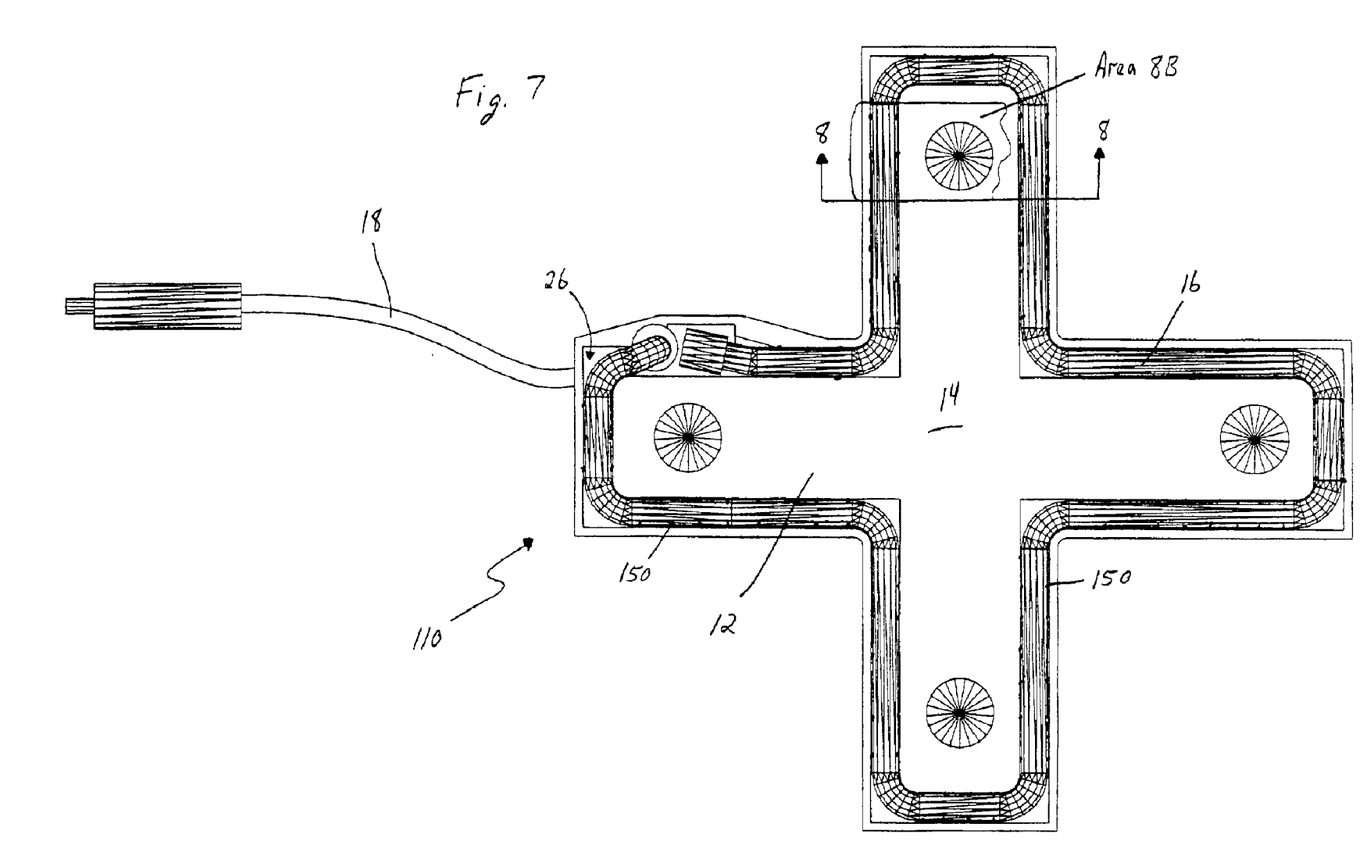
FIG. 7 is a plan view of a display unit according to an embodiment of the invention.
Figure 8A:
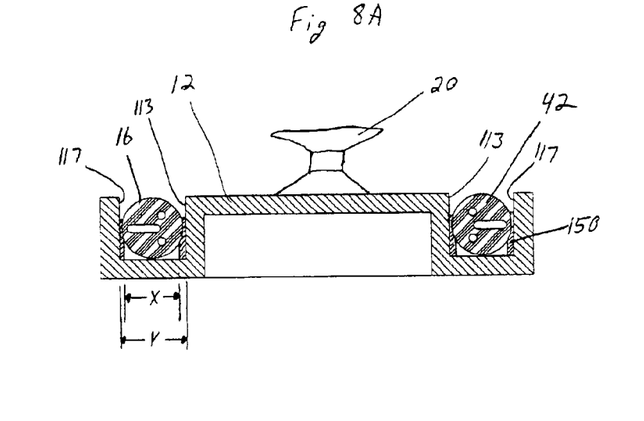
FIG. 8A is cross-sectional view through line 8—8 of the display unit of FIG. 7.
Figure 8B:
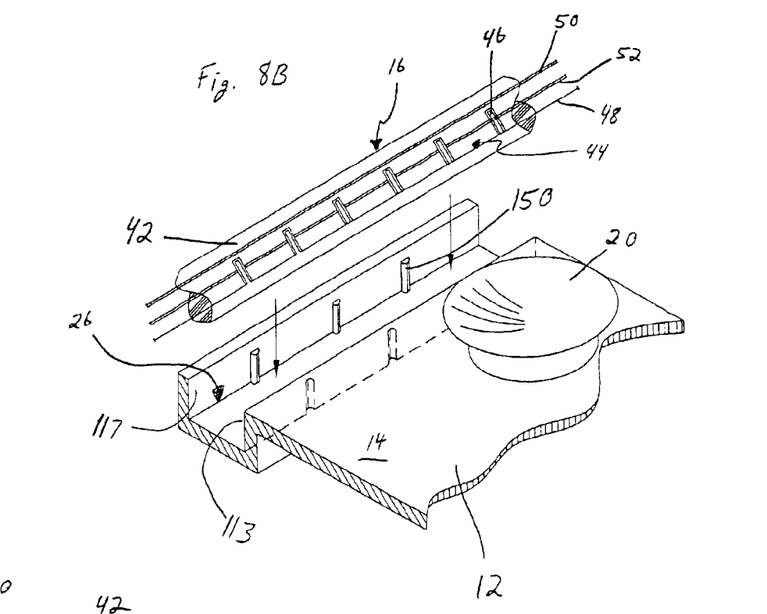
FIG. 8B is an exploded view of the area 8B designated on FIG. 7.

Referring now to FIGS. 7 and 8, a display unit 110 according to another embodiment of the present invention is shown. Display unit 110 differs from display unit 10 in that body 12 includes projections 150 formed within channel 26 that create pinch points for frictionally retaining rope light 16. Except for aspects and features related to its retention of rope light 16, all other aspects and features of display unit 110 are the same as for display unit 10.

Opposing pairs of projections 150 may be formed along opposing walls 113, 117 of channel 26. In this embodiment, outline surface 13 refers to the inner opposing walls of channel 26, because the rope light 16 is frictionally fastened to outline surface 113 rather than to rearward surface 13. Suppose that the width of channel 26 between opposing walls 113 and 117 is a dimension Y that is slightly larger than the outer diameter of rope light 16. Suppose further that the distance between opposing pairs of projections 150 is a dimension X smaller than the outer diameter of rope light 16. As such, opposing pairs of projections 150 form pinch points of dimension X that frictionally retain rope light 16. Pinch points may be formed in other ways as well, such as with single projections that reduce the cross-section of the channel or by simply creating a channel having a width smaller than rope light 16. Further, the pinch points may be integrally molded with the body.

Pinch points formed by opposing pairs of projections 150 provide advantages, such as concentrating retention at discrete points, which serve to reduce assembly forces while limiting motion of the rope light 16 in multiple directions after assembly. Pinch points in general are advantageous due to the flexible properties of rope light 16. In one embodiment, rope light 16 is formed from a flexible cylinder 42 that is preferably compressible. As such, cylinder 42 conforms to projections 150.

As shown in FIG. 8B, disposed along the length of cylinder 42 is a series of miniature lights 46 connected by a wire 48 to form a string 44 of lights. Miniature lights 46 may all be the same color or there may be a mix of colored lights. One end of the string of lights 44 is connected to a positive wire 50 and the opposite end is connected to a negative wire 52. Positive wire 50 and negative wire 52 are connected to power cord 18. When connected to an electric power source, current flows through the string of lights 44, which thereby illuminate cylinder 42. Cylinder 42 is preferably transparent and has a tint of a desired color. As string of lights 44 glows, cylinder 42 is illuminated according to the tint of the cylinder. Thus, when connected to a power source, rope light 16 illuminates the outline of the logo in the color desired.

Figure 9:
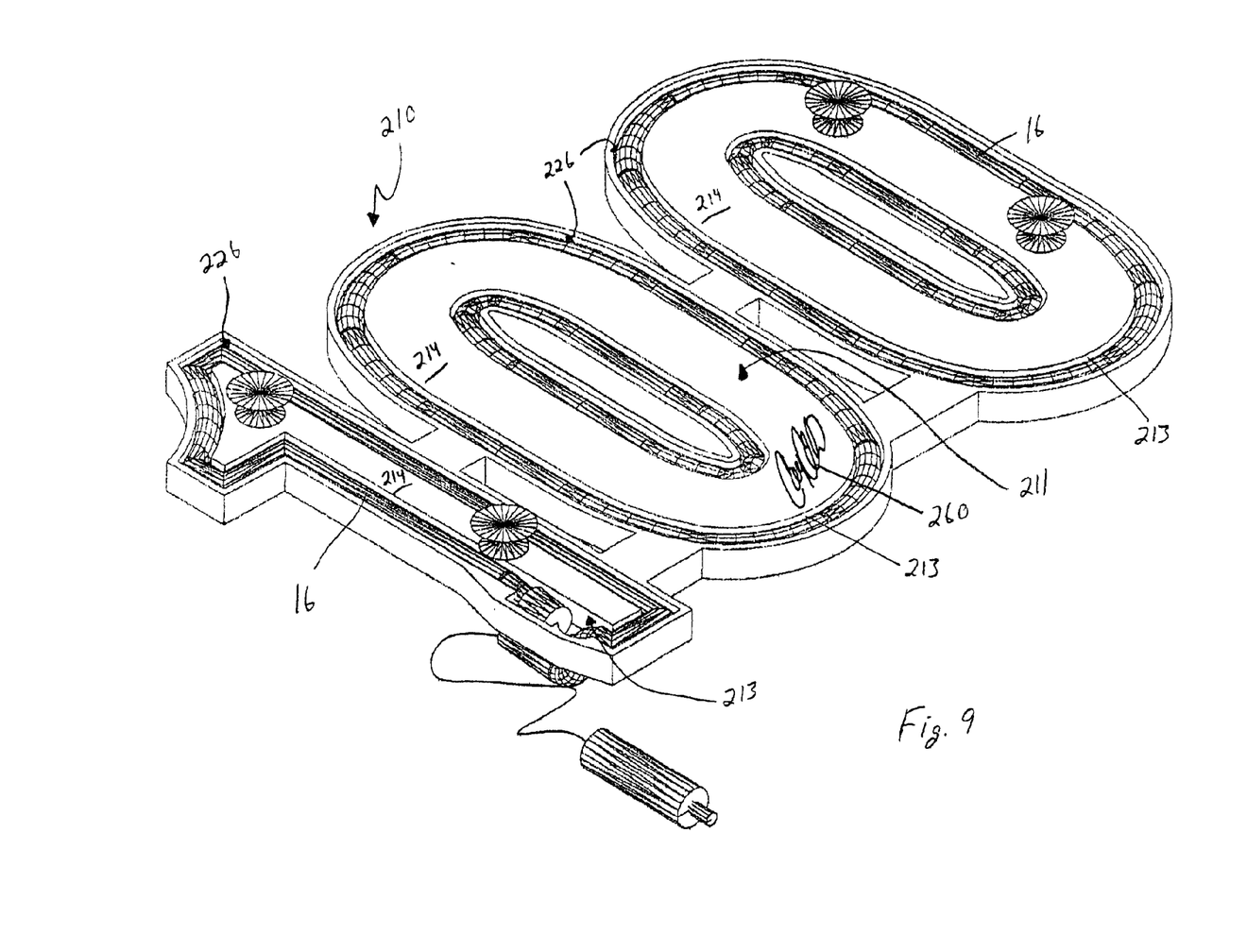
FIG. 9 is front perspective view of a display unit according to an embodiment of the present invention shown detached from a support surface.
Figure 10:
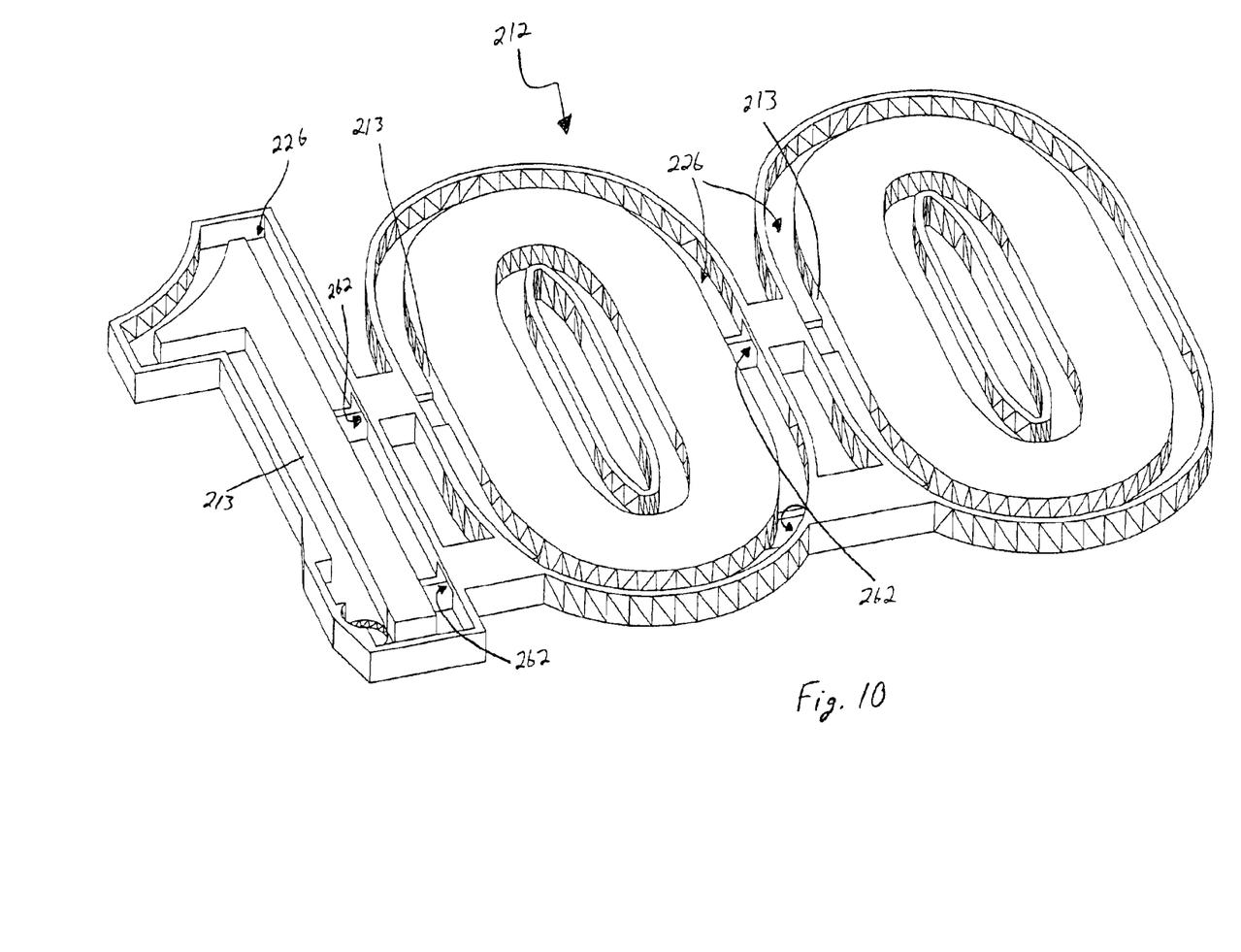
FIG. 10 is an alternative front perspective view of the body of the display unit of FIG. 9 shown with the rope light removed.
Figure 11:
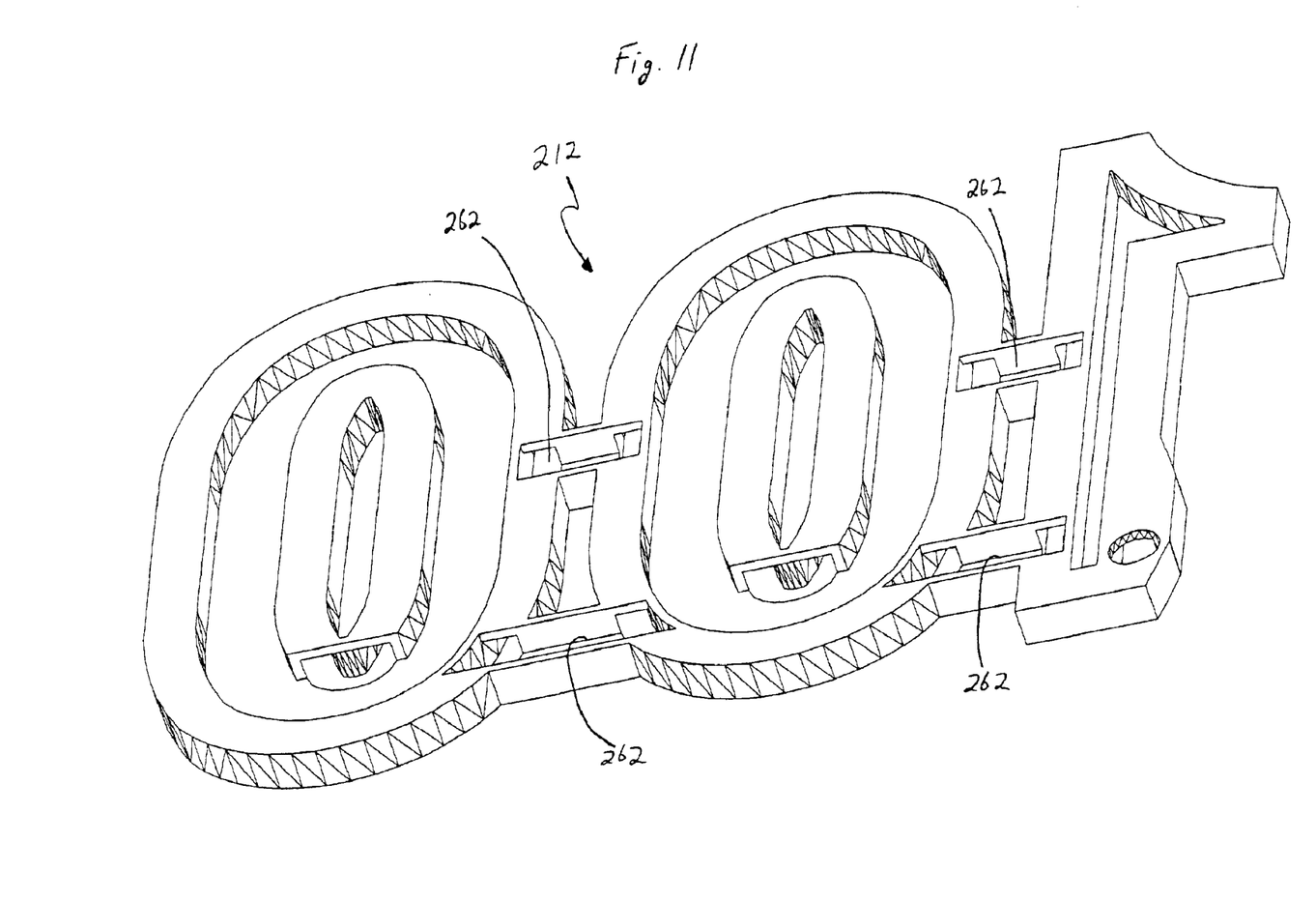
FIG. 11 is a rear perspective view of the body of the display unit of FIG. 9 shown with the rope light removed.

Referring now to FIGS. 9–11, a display unit 210 according to a further embodiment of the present invention is shown. Display unit 210 forms a multi-digit numeric symbol 211 and is adapted to be connected to a vehicle window (not shown). Because symbol 211 has many sections, outline surface 213 includes the inner walls of channels 226 and defines inner region 214, which includes portions of each digit forming symbol 211. Further, inner region 214 includes a cursive lettering mark 260 that represents the signature of known person associated with that number. Except for aspects and features related to symbol 211 and mark 260, other aspects and features are the same as display unit 110. Suppose as an example that display unit 210 represents the number "100" for a racecar. As such, symbol 211 is the number "100" and inner region 214 forms portions of the symbol 211.

Rope light 16 surrounds the perimeter of inner region 214 to form the outline of symbol 211. Rope light 16, as shown in FIG. 9, may be a single, continuous rope light that is routed within channel 16. However, multiple rope lights may be used to outline symbol 211 including rope lights of different colors. As shown in FIGS. 9–11, rope light 216 may be routed between channels 226 via connection channels 262. In this example, channels 226 extend to the central portions of inner region 214, which includes the centers in the number "100" of symbol 211. As such, symbol 211 is completely outlined by rope light 216 and all digits of the number "100" are illuminated. To enhance such illumination, inner region 214 is preferably translucent with a tint (or multiple tints) for a desired color. Alternatively, all or part of inner region 214 may be opaque. When rope light 216 is illuminated, it outlines symbol 211 and further illuminates inner region 214.

Cursive lettering mark 260 may be formed in various ways. In one embodiment, raised portions of body 212 form mark 260, while paint, such as a gold colored paint, highlights the mark. In other embodiments, the symbol may be simply formed from raised portions of body 212, from carved or stenciled portions of body 212, or simply by paint. In further embodiments, symbol 260 may be formed using a contrast with the material forming body 212. For example, body 212 may include an opaque material and mark 260 may be formed from a translucent material highlighted by a light source. In another example, body 212 may be a translucent material that transmits light from rope light 16, while mark 260 may be formed from opaque lettering. Additionally, the signature can be provided on any of the previously discussed embodiments 10, 110.

The present invention may display a multitude of different symbols and logos. For example, the colors represented and the symbol formed could be associated with a sports team or even a sports star. As an example, the symbol 11 could be the jersey number (28) of Marshall Faulk, a NFL running back, and the colors could be the colors of his football team (e.g. blue body and yellow rope light for the ST. LOUIS RAMS). Further, the mark could be Marshall Faulk's signature.

While the present invention has been described in connection with the illustrated embodiments, it will appreciated and understood that modifications may be made without departing from the true spirit and scope of the invention. In particular, various shapes and sizes of symbols and logos may be formed. Additionally, multiple rope lights having the same or different colors may used and the inner region may include multiple inner region segments. Further, the display unit may be attached in a variety of ways and may be made from a variety of materials.

We claim:

1. A portable display unit adapted to illuminate a symbol formed by the unit, the unit comprising:
    a symbol body comprising an outline surface substantially outlining the symbol and an inner region substantially filling the symbol;
    a rope light attached to the outline surface and substantially outlining the inner region;
    a power cord connected to the rope light; and
    a hanging element connected to a surface of the display unit and adapted to removably attach the unit to a support.

2. The display unit of claim 1, wherein the body comprises a channel for receiving the rope light and the outline surface is a surface of the channel.

3. The display unit of claim 2, wherein the body comprises a plurality of pinch points in the channel for frictionally retaining the rope light.

4. The display unit of claim 3, further comprising a plurality of protrusions formed within the channel, at least one the protrusions forming one of the pinch points.

5. The display unit of claim 4, wherein an opposing pair of the protrusions form one of the pinch points.

6. The display unit of claim 1, wherein the body is made of plastic.

7. The display unit of claim 6, wherein the plastic comprises injection molded plastic.

8. The display unit of claim 1, wherein the display unit represents a two color logo of a known university comprising a first color and a second color, the body being of the first color and the rope light comprises a cylinder having the second color.

9. The display unit of claim 8, wherein the symbol is a symbol associated with the known university.

10. The display unit of claim 1, wherein the display unit represents a symbol of a known sports team comprising a first color and a second color, the body being of the first color and the rope light comprises a cylinder having the second color.

11. The display unit of claim 1, wherein the display unit has a front side and a rear side, the display unit further comprising a shade located rearward of the rope light for shading rearward illumination of the rope light.

12. The display unit of claim 11, wherein the shade comprises an opaque portion of the body.

13. The display unit of claim 1, wherein the body is opaque.

14. The display unit of claim 1, wherein the at least one hanging element comprises a suction cup.

15. The display unit of claim 14, wherein the suction cup comprises a double suction cup having two opposing suction cup surfaces, one of the opposing suction cup surfaces being attached to the body.

16. The display unit of claim 1, wherein the power cord comprises a DC power connector.

17. The display unit of claim 1, further comprising a mark representing a known person's signature located on the body.

18. A portable display unit adapted to illuminate a symbol formed by the unit, the unit comprising:
    a symbol body having a front face, a rear face and an inner region substantially filling the symbol;
    a rope light attached to the body and substantially outlining the symbol, the rope light illuminating the front face;
    a shade connected to one of the body and the rope light for shading light from the rope light to the rear face; and
    an attachment device for attaching the display unit to a support.

19. The portable display unit of claim 18, wherein the shade comprises an opaque rear surface of a channel formed in the body, the channel receiving the rope light.

20. The portable display unit of claim 18, wherein the body is opaque and the shade comprises the body.

21. A portable vehicle display unit adapted to illuminate a symbol formed by the unit, the unit comprising:
    a symbol body defining a channel for receiving a rope light and shaped to substantially outline the symbol, the channel defining an inner region substantially filling the symbol;
    a rope light retained within the channel;
    a plurality of retention projections formed within the channel and defining pinch points for retaining the rope light;
    a DC power cord connected to the rope light having a DC power connector at one end; and
    a plurality of suction cups attached to the body and adapted to removably attach the unit to a surface of a vehicle.

22. A symbol body for a portable display unit adapted to illuminate a symbol formed by the symbol body, the symbol body comprising:
    an outline surface substantially outlining the symbol, the outline surface for receiving a rope light; and
    an inner region substantially filling the symbol.

23. The symbol body of claim 22, further including a channel for receiving the rope light, wherein the outline surface is a surface of the channel.

24. The symbol body of claim 23, further including a plurality of pinch points in the channel for frictionally retaining the rope light.

25. The symbol body of claim 24, further including a plurality of protrusions formed within the channel, at least one the protrusions forming one of the pinch points.

26. The symbol body of claim 25, wherein an opposing pair of the protrusions form one of the pinch points.

27. The symbol body of claim 22, wherein the body is made of plastic.

28. The symbol body of claim 27, wherein the plastic includes injection molded plastic.

* * * * *